April 18, 1950  W. H. SUYDAM, JR  2,504,753
WELDING METHOD AND APPARATUS
Filed Jan. 15, 1946
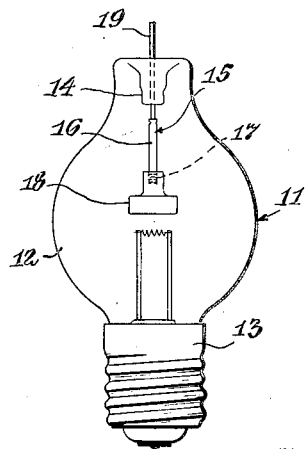
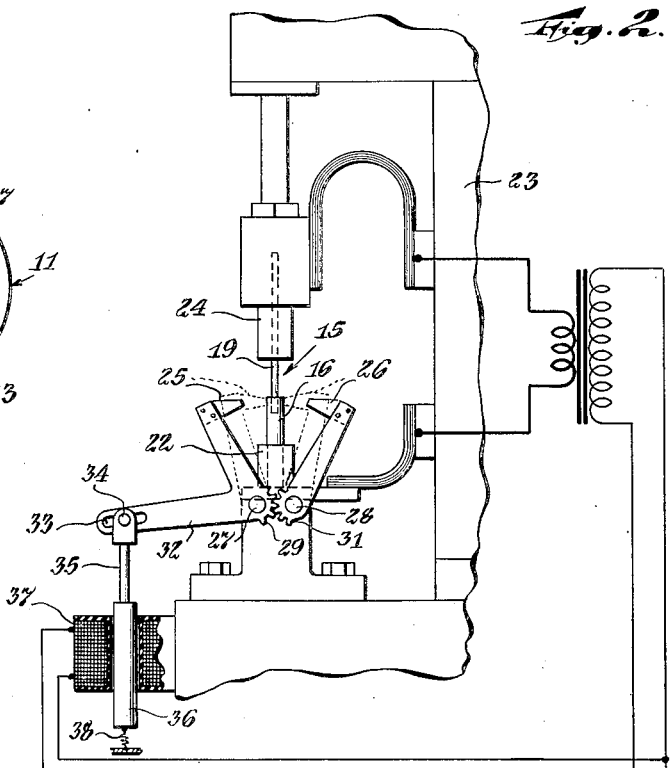
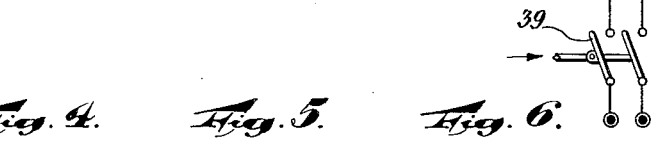
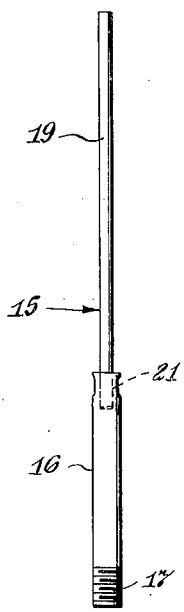
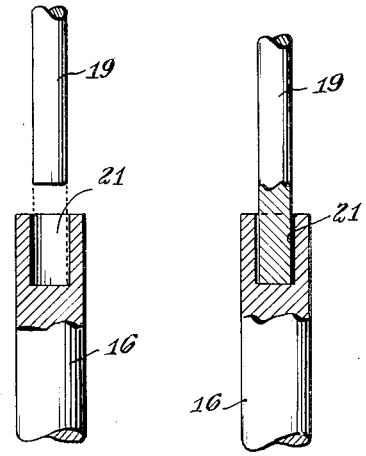
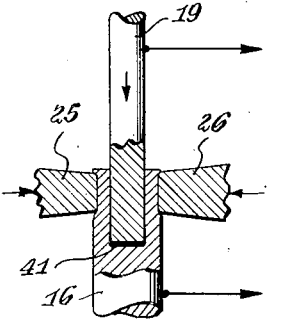
INVENTOR
W. H. SUYDAM, JR.
BY
ATTORNEY Patented Apr. 18, 1950

2,504,753

UNITED STATES PATENT OFFICE 2,504,753

WELDING METHOD AND APPARATUS

William H. Suydam, Jr., Glen Ridge, N. J., assignor to Westinghouse Electric Corporation, East Pittsburgh, Pa., a corporation of Pennsylvania Application January 15, 1946, Serial No. 641,295

8 Claims. (Cl. 219—4)

This invention relates to the manufacture of composite electrical conductors and more particularly to the production of leads for electrical devices.

The principal object of my invention, generally considered, is to secure portions of composite leads together, so that dependable electrical contact and mechanical strength is obtained at less cost than that of previous methods.

Another object of my invention is to produce and mechanically reinforce a weld between portions of a composite electrical conductor without damaging the weld nugget.

A further object of my invention is to produce an electrical connection between conductors of different diameters, comprising forming an axial pocket in an end of the conductor of larger diameter, inserting an end of the other conductor therein, and welding at high heat for a short time interval, while pressing the sides defining said pocket about the smaller conductor at the time the metal is soft.

A still further object of my invention is to produce strong straight leads which may be adapted for electrical devices such as Rectigons, portions of such leads being of relatively high expansion metal such as nickel or copper, and other portions being of relatively low expansion material such as tungsten or molybdenum, in which the conductor from the latter group has its end fitted in a pocket of the conductor of the former group, where it is welded in place while the soft sides of the pocket are simultaneously pressed firmly thereabout, thereby producing leads having dependable electrical connections, eliminating any necessary subsequent crimping operation, and avoiding cracking the smaller lead or disturbing the weld nugget.

Other objects and advantages of the invention will become apparent as the description proceeds.

Referring to the drawing:

Fig. 1 is an elevational view of a Rectigon embodying my invention.

Fig. 2 is an elevational view of a welding machine which may be used in practicing my invention.

Fig. 3 is an elevational view of a composite lead which may be manufactured in accordance with my invention.

Fig. 4 is an enlarged fragmentary elevational view of adjacent portions of the composite lead prior to connection.

Fig. 5 is a view similar to Fig. 4, but showing the parts after the smaller lead has been inserted in an axial pocket at the end of the larger lead.

Fig. 6 is a view corresponding to Fig. 5 but showing a subsequent operation in which welding current is being passed through the leads, and the sides defining the pocket simultaneously squeezed together.

When welding tungsten, molybdenum, or the like, recrystallization thereof in the vicinity of the weld has been difficult to control, even with percussive welding. While the great majority of welds may be made with little or no recrystallization, they cannot be depended upon from a mechanical standpoint unless some material like silver is introduced between the connected metals. I have found a practical way to get perfect welds which have no recrystallization in the center of the tungsten, for example, by controlling the weld cycle, peak current, and heat flow from the surface. Such welds have been found quite satisfactory for current-carrying purposes. The problem was to produce such welds and reinforce them mechanically without damaging the weld nugget, and at a lower cost than with previous methods.

I will now describe the manufacture of a composite lead for a 6 ampere Rectigon, although it will be understood that a similar method may be employed for making other composite conductors.

Referring to the drawing in detail, like parts being designated by like reference characters, there is shown a Rectigon 11 comprising a translucent vitreous envelope 12, a screw-threaded base 13 at one end, and a press 14 at the other end and through which a composite lead 15 extends. The lead in the present embodiment comprises a nickel rod 16 threaded at one end designated 17, and to which is applied an anode member 18 held thereon by the threads. The portion 19 of the composite lead which extends through the press is formed, in this instance, of tungsten.

Figure 3 illustrates the finished composite lead 15 consisting of the nickel lead 16 having a pocket formed in an end and receiving the adjacent end portion of the tungsten lead 19. Figures 4, 5 and 6 illustrate steps in the manufacture of the lead of Fig. 3. The nickel lead 16 in Fig. 4 is shown formed with pocket 21 which has been axially drilled, punched or otherwise constructed in the end opposite that bearing the threads 17. The pocket in the present embodiment is formed to a depth of approximately ⅛" and of a diameter about .006" larger than that of the tungsten lead 19.

As shown in Figs. 2 and 5, the tungsten lead 19 is inserted in the pocket 21 after the lead 16 has been positioned in the lower electrode or chuck 22 of the welding machine 23 and the lead 19 positioned in the upper chuck or electrode 24 of said machine. The lower chuck 22 has associated therewith clamping jaws 25 and 26, pivoted respectively at 27 and 28, with their hubs formed with intermeshing gear teeth 29 and 31. The jaw 25 is formed with an operating arm 32, slotted as indicated in 33, and receiving a pivot pin 34 on a rod 35 extending from the armature 36 of solenoid 37. The armature 36 is drawn downwardly by spring 38 and/or gravity, so that the jaws are normally held apart in the full line positions illustrated.

The circuit for performing the welding operation is such, as illustrated, that upon closing the switch 39 the solenoid is energized at the time the welding current starts to flow, so that the armature 36 is pulled up to cause the jaws 25 and 26 to press the sides of the lead 16 defining the pocket 21, simultaneously with the performance of the welding operation. The sides of the pocket are thus contracted about the lead 19 while the metal thereof is soft from the heat of the welding operation, thereby mechanically strengthening the weld connection, while not interfering with the weld nugget 41, which indicates that the weld is between the end of the lead 19 and that portion of the lead 16 defining the bottom of the pocket 21. I have found that in manufacturing such leads, a 20 kv.-a. welder is desirable and should be arranged for high-heat short-interval operation.

From the foregoing disclosure, it will be seen that I have accomplished two objectives, that is, I have produced a strong lead with dependable electrical connection and eliminated any necessary crimping operation. At the same time, since the metal having the higher coefficient of expansion is while soft pressed against the tungsten, a tight connection is made, as upon cooling continuous pressure is exerted by the nickel against the sides of the tungsten lead. Since the jaw pressure is applied while the metal is soft, there is no danger of cracking the tungsten or disturbing the weld nugget. It has been found that straight leads, which cannot be otherwise produced, may be made by this method.

Although I have described my invention specifically for making nickel-tungsten leads, it will be understood that another metal, such as cobalt, iron, copper or an alloy of two or more of said metals, may be substituted for nickel, and another metal, such as molybdenum, tantalum, or an alloy of two or more of said metals, may be used instead of tungsten, the large lead however being that of the higher coefficient of expansion so as to effect the desired pressure about the smaller lead after cooling.

Although a preferred embodiment of my invention has been disclosed, it will be understood that modifications may be made within the spirit and scope of the appended claims.

I claim:

1. The method of electrically connecting two conductors of different diameters, comprising forming an axial pocket in the end portion of the conductor of larger diameter, inserting therein an end portion of the other conductor, and applying welding current through said conductors to cause the end of the smaller conductor which is received in said axial pocket to be united to the portion of said larger conductor defining the bottom of said pocket, while pressing the sides defining said pocket, while softened by the heat of the welding operation, to cause the pocket-received portion of said smaller conductor to be tightly gripped in said pocket.

2. The method of electrically connecting two conductors of different diameters, in which the conductor of larger diameter is formed of metal of the higher coefficient of expansion, comprising forming an axial pocket in an end portion of said conductor of larger diameter, inserting an end portion of the smaller conductor therein, and applying welding current through said conductors to cause the end of the smaller conductor which is received in said axial pocket to be united to the portion of said larger conductor defining the bottom of said pocket, while pressing the sides defining said pocket, while softened by the heat of the welding operation, to cause the pocket-received portion of said smaller conductor to be tightly gripped in said pocket.

3. The method of electrically connecting a conductor selected from the group consisting of nickel, cobalt, iron, copper, and alloys of two or more of said metals, to one formed of a metal selected from the group consisting of tungsten, molybdenum, tantalum, or an alloy of two or more of said metals, comprising forming an axial pocket in an end portion of said first conductor, inserting an end portion of the other conductor therein, and applying welding current through said conductors while pressing the sides defining said pocket, while softened by the heat of the welding operation, to cause the pocket-received portion of said smaller conductor to be tightly gripped in said pocket.

4. The method of electrically connecting a nickel conductor to one of smaller diameter and formed of tungsten, comprising forming an axial pocket in an end portion of said nickel conductor, inserting therein an end portion of the tungsten conductor, and applying welding current through said conductors to cause the end of the smaller conductor which is received in said axial pocket to be united to the portion of said larger conductor defining the bottom of said pocket, while pressing the sides defining said pocket, while softened by the heat of the welding operation, to cause the pocket-received portion of said smaller conductor to be tightly gripped in said pocket.

5. A machine for welding two electrical conductors comprising a lower chuck for holding one conductor, an upper chuck for holding the other conductor, and means for simultaneously pressing radially on the side of a portion defining an upwardly opening axial pocket in a conductor when held in said lower chuck, when a conductor while held in said upper chuck is inserted in said axial pocket, and passing welding current therethrough.

6. A welding machine comprising a lower electrode with an upwardly opening chuck for holding a relatively large lead, an upper electrode with a downwardly opening chuck for holding a relatively small lead, a pair of jaws associated with said lower electrode, so as to press radially on the sides of a portion defining an upwardly-opening axial pocket in the upper portion of said relatively large lead when held in said upwardly-opening chuck, and means for causing said jaws to so press said upper portion when a relatively small lead, while held in said downwardly opening chuck, is inserted in said axial pocket, simultaneously with the passage of welding current through said leads.

7. The method of electrically connecting a nickel conductor to one of smaller diameter and formed of tungsten comprising forming an axial pocket approximately ⅛" deep and of a diameter of about .006" larger than that of the tungsten conductor in an end portion of said nickel conductor, inserting in said pocket an end portion of said tungsten conductor, and applying a high welding current for a short interval through said conductors to cause the end of the tungsten conductor, which is received in said pocket, to be united to the portion of said nickel conductor defining the bottom of said pocket, while pressing the sides of said nickel conductor which defines said pocket while softened by the heat of the welding operation, in order to cause the pocket-received portion of the tungsten conductor to be tightly gripped in said pocket.

8. A welding machine comprising a lower electrode with an upwardly opening chuck for holding a relatively large lead, an upper electrode with a downwardly opening chuck for holding a relatively small lead, a pair of jaws pivoted to move simultaneously to and from one another so as to press radially on the sides of a portion defining an upwardly-opening axial pocket in the upper portion of such a lead when held in said upwardly opening chuck, an operating arm for said jaws, a solenoid and associated armature for operating said jaws, means connecting said solenoid to said arm, a transformer for supplying welding current to said chucks, leads connecting both solenoid and transformer to a source of current, and a switch for controlling the circuit to both said solenoid and transformer, whereby upon closing said switch the jaws will press the upper portion of said relatively large lead when a relatively small lead, while held in said downwardly opening chuck, is inserted in said axial pocket, simultaneously with the passage of welding current through said leads.

WILLIAM H. SUYDAM, Jr.

REFERENCES CITED

The following references are of record in the file of this patent:

UNITED STATES PATENTS

| Number | Name | Date |
| --- | --- | --- |
| Re. 14,798 | Edison | Feb. 3, 1920 |
| 434,532 | Thomson | Aug. 19, 1890 |
| 1,272,700 | Newcomb | July 16, 1918 |
| 1,361,652 | Wetmore | Dec. 7, 1920 |
| 1,458,274 | Clawson | June 12, 1923 |
| 1,722,195 | Bumstead | July 23, 1929 |
| 2,034,560 | Bumstead | Mar. 17, 1936 |
| 2,132,071 | Johnson | Oct. 4, 1938 |
| 2,298,937 | Green | Oct. 13, 1942 |
| 2,370,538 | Hirmann | Feb. 27, 1945 |
| 2,380,525 | Hirmann | July 31, 1945 |